United States Patent
Bose-Kolanu

(10) Patent No.: US 11,576,013 B2
(45) Date of Patent: Feb. 7, 2023

(54) PROXY GATEWAY MEDIATED INTERNET-ENABLED DATA CONSUMPTION OVER UNSTRUCTURED SUPPLEMENTARY SERVICE DATA

(71) Applicant: Meta Platforms, Inc., Menlo Park, CA (US)

(72) Inventor: Abhishek Bose-Kolanu, Menlo Park, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 63 days.

(21) Appl. No.: 17/184,693

(22) Filed: Feb. 25, 2021

(65) Prior Publication Data

US 2021/0297822 A1 Sep. 23, 2021

Related U.S. Application Data

(63) Continuation of application No. 16/821,574, filed on Mar. 17, 2020, now Pat. No. 10,966,066.

(51) Int. Cl.
*H04W 4/20* (2018.01)
*H04W 12/088* (2021.01)
(Continued)

(52) U.S. Cl.
CPC ........... *H04W 4/20* (2013.01); *H04W 12/088* (2021.01); *H04W 28/06* (2013.01); *H04W 28/08* (2013.01);
(Continued)

(58) Field of Classification Search
CPC ............... H04W 4/20; H04W 72/1257; H04W 12/0808; H04W 28/08; H04W 72/1268; H04W 28/06; H04W 76/10; H04W 80/02; H04W 88/16; H04W 12/088; H04W 80/04; H04W 28/065; H04L 2212/00; H04L 69/08
(Continued)

(56) References Cited

U.S. PATENT DOCUMENTS 7,792,935 B2 9/2010 Kaijanlahti
8,090,858 B2 1/2012 Poyhonen
(Continued)

*Primary Examiner* — Inder P Mehra
(74) *Attorney, Agent, or Firm* — BakerHostetler

(57) ABSTRACT

Apparatuses, methods, and systems for internet-enabled data for transparent application consumption over unstructured supplementary service data are disclosed. One method includes generating, by an application, IP (internet protocol) packets, encapsulating, by a proxy interface, the IP packets into protocol data units (PDUs), generating frames of data for facilitating communication through a wireless link, wherein the frames include data slots and control information slots, identifying, by the base station, unused control information slots of the frames of data, scheduling transmission of a stream of the PDUs over the unused control information slots for a full-time duration of the unused control information slots, inserting the PDUs into one or more of the scheduled control information slots of the frames of data as specified by the scheduling, and transmitting, by the computing device, the frames of data through the wireless link to the base station on the scheduled control information slots.

19 Claims, 6 Drawing Sheets

(51) Int. Cl.
*H04W 28/06* (2009.01)
*H04W 28/08* (2009.01)
*H04W 72/12* (2009.01)
*H04W 76/10* (2018.01)
*H04W 80/02* (2009.01)
*H04W 88/16* (2009.01)
*H04W 80/04* (2009.01)

(52) U.S. Cl.
CPC ... *H04W 72/1257* (2013.01); *H04W 72/1268* (2013.01); *H04W 76/10* (2018.02); *H04L 2212/00* (2013.01); *H04W 80/02* (2013.01); *H04W 88/16* (2013.01)

(58) Field of Classification Search
USPC ............................................ 455/466
See application file for complete search history.

(56) References Cited

U.S. PATENT DOCUMENTS

| | | |
|---|---|---|
| 8,619,757 B2 | 12/2013 | Shaheen et al. |
| 9,078,290 B2 | 7/2015 | Lai |
| 2004/0264368 A1 | 12/2004 | Heiskari et al. |
| 2008/0084898 A1 | 4/2008 | Miyaho et al. |
| 2014/0237585 A1* | 8/2014 | Khan ................. H04L 63/0272 726/15 |
| 2017/0289858 A1 | 10/2017 | Faccin et al. |
| 2018/0213477 A1 | 7/2018 | John Wilson et al. |
| 2019/0068498 A1 | 2/2019 | Perez |

* cited by examiner

PROXY GATEWAY MEDIATED INTERNET-ENABLED DATA CONSUMPTION OVER UNSTRUCTURED SUPPLEMENTARY SERVICE DATA

RELATED APPLICATIONS

This patent application is a continuation of U.S. patent application Ser. No. 16/821,574 filed Mar. 17, 2020, which is herein incorporated by reference.

FIELD OF THE DESCRIBED EMBODIMENTS

The described embodiments relate generally to wireless communications. More particularly, the described embodiments relate to systems, methods and apparatuses for internet-enabled data for transparent application consumption over unstructured supplementary service data.

BACKGROUND

Voice-only smart phone users without access to WiFi (wireless fidelity) do not have access to the internet and cannot use internet-enabled applications.

It is desirable to have methods, apparatuses, and systems for internet-enabled data for transparent application consumption over unstructured supplementary service data.

SUMMARY

An embodiment includes a method. The method includes generating, by an application operating on a computing device, IP (internet protocol) packets, encapsulating, by a proxy interface of the computing device, the IP packets into protocol data units (PDUs), generating, by the computing device, frames of data for facilitating communication through a wireless link, wherein the frames include data slots and control information slots, identifying, by the base station, unused control information slots of the frames of data, scheduling transmission of a stream of the PDUs over the unused control information slots for a full-time duration of the unused control information slots, inserting, by the computing device, the PDUs into one or more of the scheduled control information slots of the frames of data as specified by the scheduling, and transmitting, by the computing device, the frames of data through the wireless link to the base station on the scheduled control information slots.

An embodiment includes a system. The system includes a base station, and a computing device. An application operating on the computing device operates to generate IP (internet protocol) packets. A proxy interface operating on the computing device operates to encapsulate the IP packets into protocol data units (PDUs). The computing device operates to generate frames of data for facilitating communication through a wireless link between the computing device and the base station, wherein the frames include data slots and control information slots. The base station operates to identify unused control information slots of the frames of data, and schedule transmission of a stream of the PDUs over the unused control information slots for a full-time duration of the unused control information slots. The computing device operates to insert the PDUs into one or more of the scheduled control information slots of the frames of data as specified by the scheduling, and transmit the frames of data through the wireless link to the base station on the scheduled control information slots.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for internet-enabled data for transparent application consumption over unstructured supplementary service data.

Figure 1:
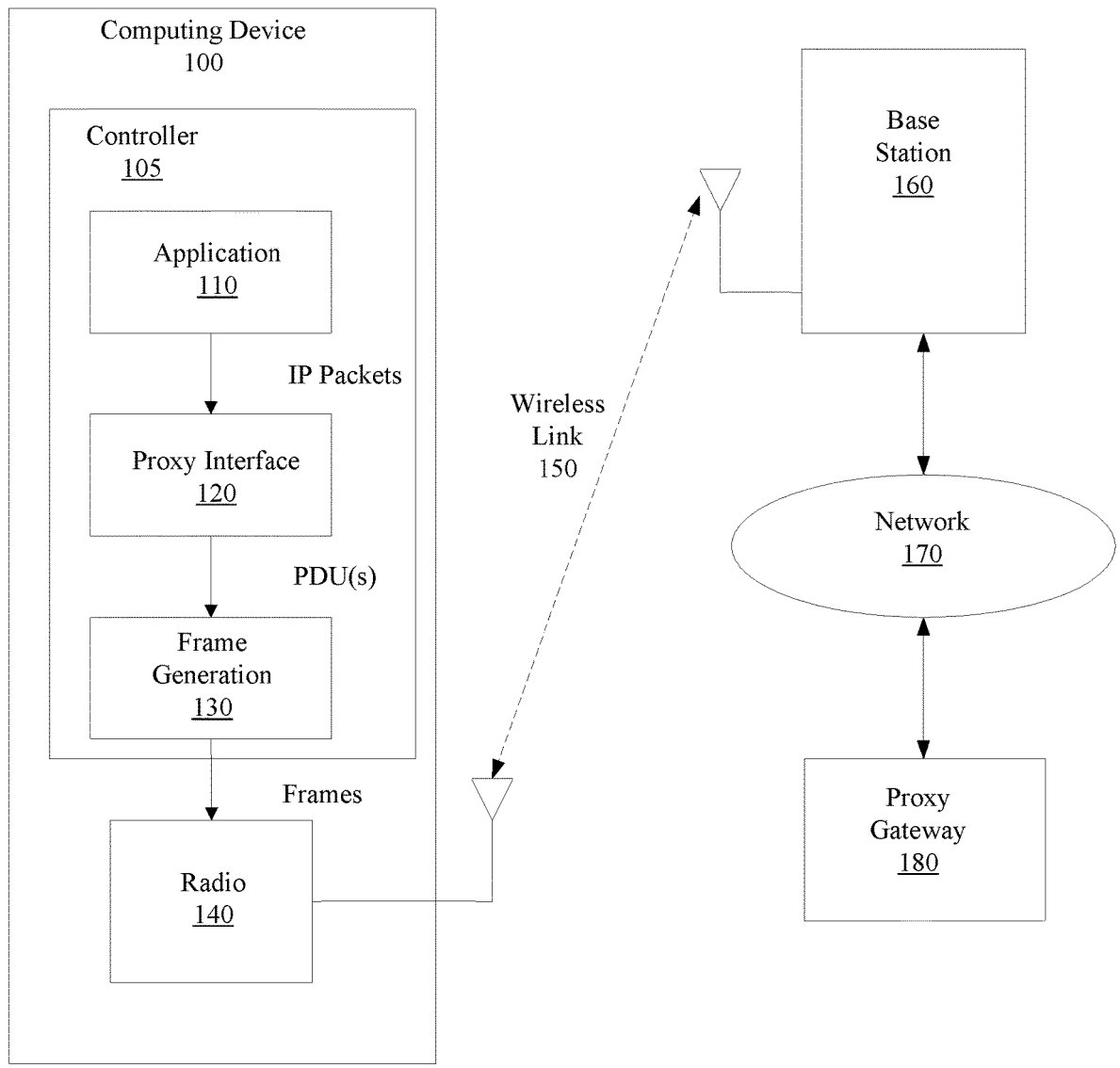
FIG. 1 shows a computing device that communicates information with a proxy gateway through a wireless link, according to an embodiment.

FIG. 1 shows a computing device 100 that communicates information to a proxy gateway 180 through a wireless link 150, according to an embodiment. For at least some embodiments, the computing device 100 communicates the information through the wireless link 150 to a base station 160, and through a network 170.

For at least some embodiments, the computing device 100 includes a controller or processor 105. For at least some embodiments, an application 110 operates on the controller 105. The application 110 includes, for example, a messaging application, a banking application, a money send application, a horoscope reader, a sports score checker, etc. For an embodiment, the application operates to generate IP (internet protocol) packets.

For at least some embodiments, a proxy interface 120 also operates on the controller 105. For at least some embodiments, the proxy interface 120 operates to encapsulate the IP packets into protocol data units (PDUs). For an embodiment, encapsulating includes the proxy interface determining an appropriate USSD (Unstructured Supplementary Service Data) format for PDUs as specified by a proxy gateway 180, and reformatting the IP packets in conformance with the specified PDU format (for example charset, encoding, and any required fields such as payload or more-to-send) of the proxy gateway 180.

For at least some embodiments, the computing device 100 generates frames (frame generation 130) of data for facilitating communication through the wireless link 150, wherein the frames include data slots and control information slots. For an embodiment, the frames include voice slots, data slots, and control information slots as will be shown in FIG. 3 and described. For at least some embodiments, the frames are generated by a baseband processor (not shown) of the computing device 100.

For at least some embodiments, the base station 160 operates to identify unused control information slots of the frames of data, and schedule transmission of a stream of the PDUs over the unused control information slots for a full-time duration of the unused control information slots of the frames of data. For an embodiment, full-time duration of the unused control information slots includes the base station allocating the full-time duration of each unused control information time slot to the computing device.

The schedule of the transmission of the stream of the PDUs over the unused control information slots for the full-time duration of the unused control information slots of the frames of data is communicated from the base station 160 to the computing device 100. For at least some embodiments, the computing device then operates to insert the PDUs into one or more of the unused control information slots of the frames of data as specified by the scheduling.

For at least some embodiments, the computing device 100 further operates to transmit the frames of data through the wireless link 150 to the base station 160 on the scheduled control information slots.

As described, for an embodiment, the base station 160 operates to identify unused control information slots of the frames of data, and schedule transmission of a stream of the PDUs over the unused control information slots for a full-time duration of the unused control information slots of the frames of data. For an embodiment, scheduling for the full-time duration of the unused control information slots includes scheduling for a full-time length of each slot. That is, a single control information slot is reserved for a computing device. The scheduling for multiple computing devices includes scheduling a slot for each computing device for the full-time duration of the schedule slot. A conventional use of control information slots includes utilizing the control information slots for call setup and takedown, paging (identifying the existence of the base station to the cell phone), and other miscellaneous housekeeping operations. An unused control information slot is such a control information slot in which the control information slot is not being utilized for any of the conventional uses, and would otherwise go unused. The control information slots can also be used to best-effort deliver SMS (short message service). For at least some embodiments, the base station 160 maintains a continuous in time circuit with the computing device 100 through the scheduling, which is a half-duplex connection different than both standard store-and-forward delivery mechanisms, such as SMS, and packet-switched connections. Whereas store-and-forward delivery mechanisms entail storing, by the service provider, communications for delivery to the computing device at a later date, continuous in time circuits require continuous communication, entailing lower latency.

For an embodiment, as described, the scheduling for the full-time duration of the unused control information slots includes the continuous in-time connection during the full-time duration of the unused control information slots. For an embodiment, the continuous in time connection is facilitated using USSD (Unstructured Supplementary Service Data) as the transport layer, and using the full availability (full length) of the time slot. This embodiment allows "back and forth" communication (which provides application interactivity) at a lower latency (for example, seconds) than SMS (for example, minutes) allows, because SMS is store-and-forward. The difference is that each communication in a store-and-forward delivery mechanism is independently stored and then forwarded from the network to the computing devices (for example, a phone). In a continuous in time delivery mechanism each communication is delivered instantly for the duration of the full time slot.

For at least some embodiments, that computing device 100 further operates to open a USSD (Unstructured Supplementary Service Data) connection. For an embodiment, opening the connection includes transmission by the computing device of a specified "shortcode" to the proxy gateway 180, whereupon the proxy gateway 180 establishes, via the base station 160, a USSD connection with the computing device 100. For an embodiment, opening a USSD connection from the computing device to a mobile network requires transmission of a USSD "shortcode" to the network. This shortcode identifies to the mobile network what network application to send the USSD data to.

The computing device further operates to order the PDUs according to the application operating on the computing device 100, schedule transmission of a stream of the PDUs over the unused control information slots according to the ordering, and transmit the frames of information that include the ordered PDUs (whereby the ordering sets the timing of the transmission of the PDUs through the unused control information slots). As previously described, for an embodiment, the computing device 100 transmits data over the unused control information slots. For an embodiment, this includes the computing device opening the USSD connection. If the computing device 100 has data to send, the computing device encapsulates the data (IP packets) as PDUs. For an embodiment, the computing device 100 orders the PDUs according to the application operating on the computing device (temporal and/or logical ordering). For an embodiment, this includes batching multiple PDUs into a single PDU or dropping PDUs, for example, if the computing device 100 is not connected to the internet for a while and the data becomes irrelevant. The computing device 100 then transmits the PDUs according to the schedule and order.

Figure 2:
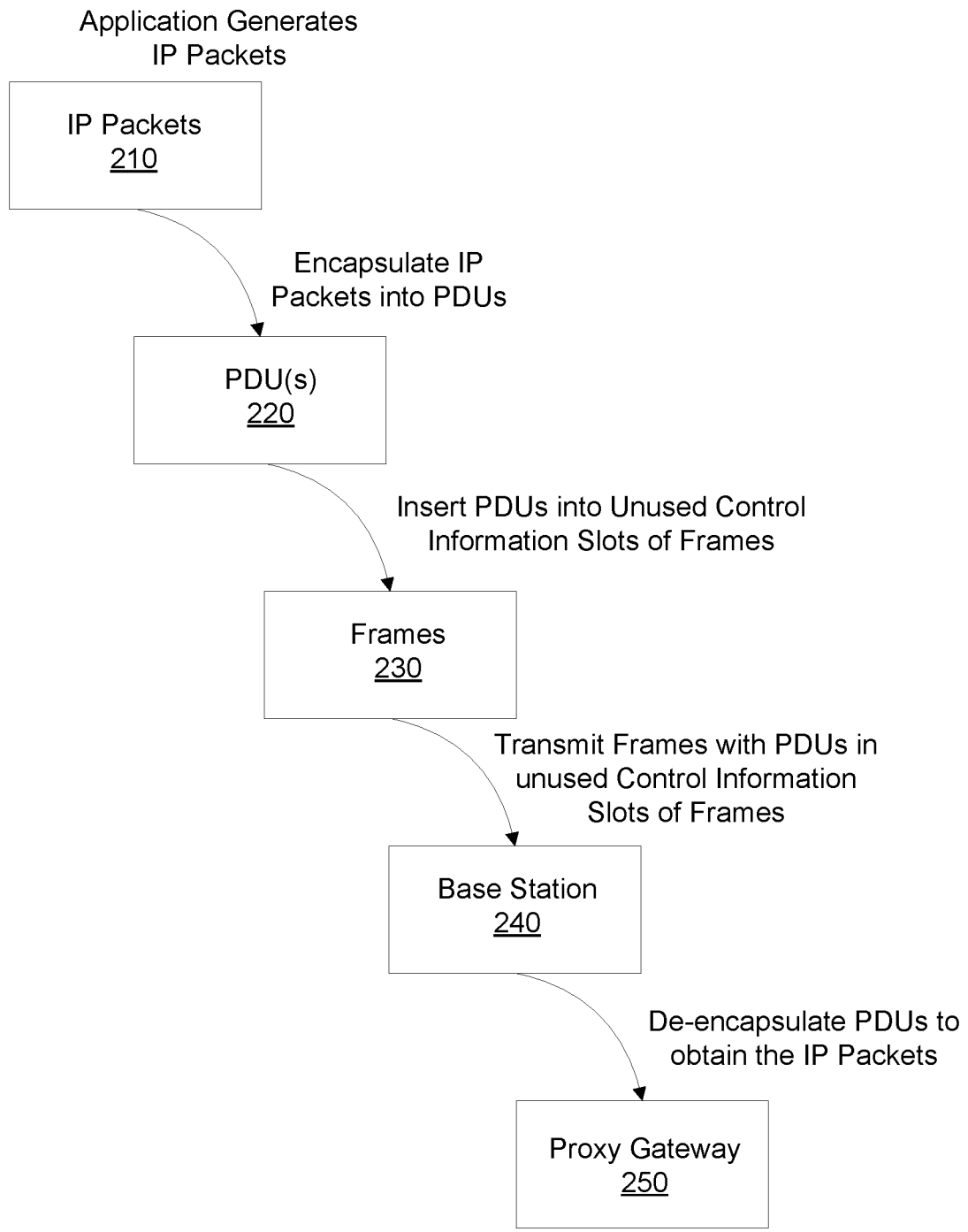
FIG. 2 shows a process for encapsulating IP packets, according to an embodiment.

FIG. 2 shows a process for encapsulating IP packets, according to an embodiment. As described, the application operating on the computing device generates IP packets 210 and inserts them into an outer IP packet addressed to the proxy interface. The proxy interface receives the IP packets 210, removes the outermost IP packet structure, and encapsulates the IP packet into PDUs 220. The PDUs 220 are inserted into unused control information slots of frames 230. The computing device then transmits the frames including the PDUs in the unused control information slots to the base station 240. The PDUs are then de-encapsulated to obtain the IP packets which are provided to the proxy gateway 250.

Figure 3:
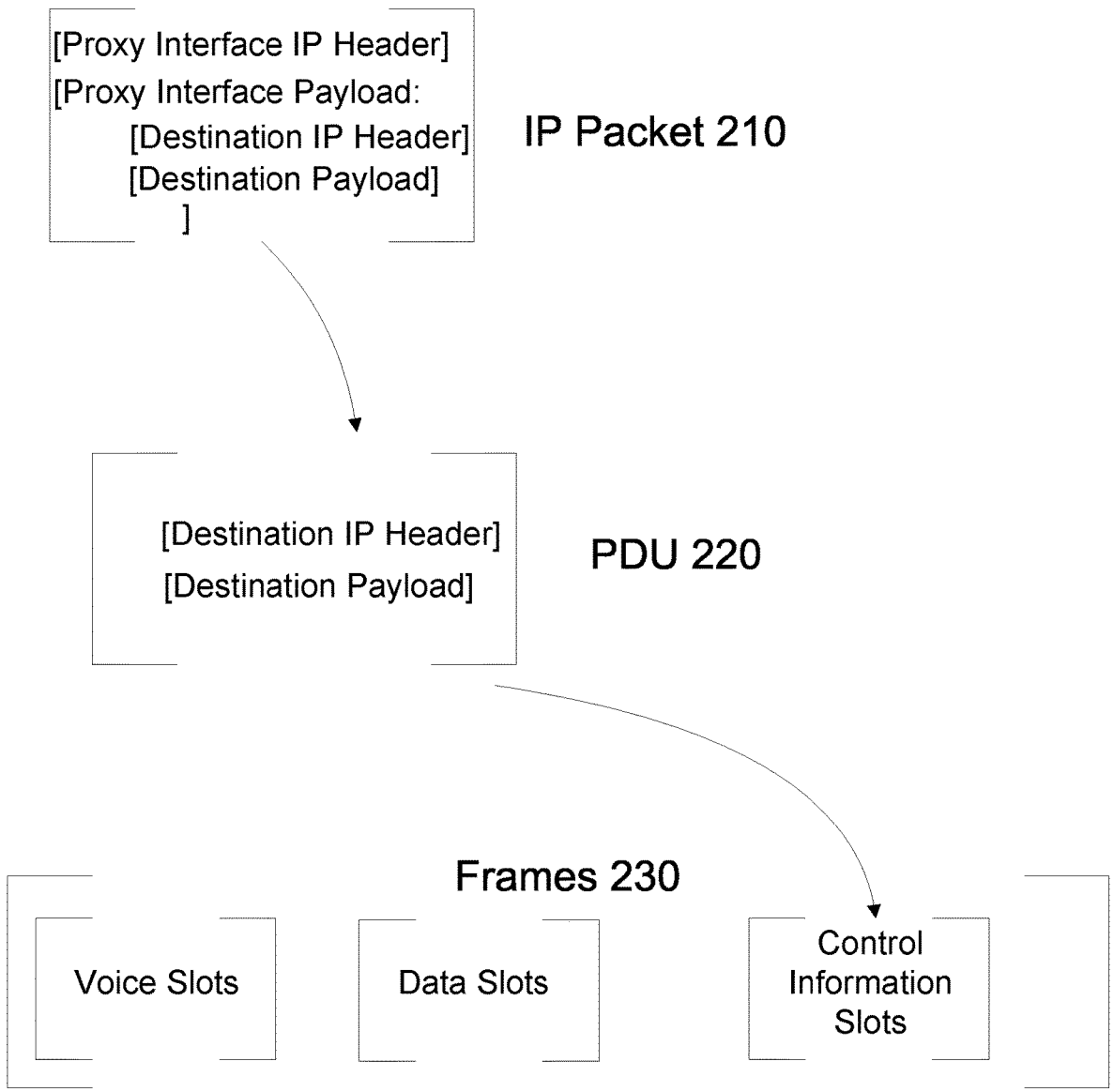
FIG. 3 depicts an IP packet being encapsulated into a PDU (protocol data unit), according to an embodiment.

FIG. 3 depicts an IP packets being encapsulated into a PDU (protocol data unit), according to an embodiment. As previously described, the IP packets 210 which include an IP header and a payload are encapsulated into a PDU 220. A stream of such PDUs is inserted into the unused control information slots of frames 230. As shown, the frames include voice slots, data slots, and the control information slots. As previously described, conventional use of control information slots includes utilizing the control information slots for call setup and takedown, paging (identifying the existence of the base station to the cell phone), and other miscellaneous housekeeping operations. An unused control information slot is such a control information slot in which the control information slot is not being utilized for any of the conventional uses, and would otherwise go unused.

Load Balancing

An embodiment includes load balancing locally on the computing device by ordering the set of PDUs to be transmitted over the unused control information slot in accordance with local IP:Port pairs selected by the application operating on the computing device.

An embodiment further includes load balancing of the IP packets transmitted by the computing device. For an embodiment, the load balancing of the IP packets includes selecting, by the computing device 100, a local port (a local port is a port on the computing device) according to application logic for a destination of the IP packets as specified by the application operating on the computing device 100 for the proxy interface 120, ordering, by the proxy interface 120 of the computing device 100, the PDUs based on priorities designated by the selected local port. For an embodiment, application logic uses a port number to designate a temporal ordering by declaring a "time to live" for the PDU in some unit of time, for example minutes. In this case, if the proxy interface is unable to obtain an opportunity to transmit the PDUs (because of a lack of availability of unused control information slots) before the time to live expires, the proxy interface may drop the PDU from its queue. For an embodiment, application logic alternatively uses a port number to designate a logical ordering by declaring a ranking preference for the ordering of the stream of PDUs. In this case, PDUs that originate from IP packets with lower port numbers are ordered in earlier positions in the PDU stream to be transmitted via unused control information slots as these slots become available.

Proxy Gateway Operation

As shown in FIG. 1, at least some embodiments include receiving, by the proxy gateway 180, the PDUs from the base station 160 through the network 170. Once the proxy gateway 180 receives the PDUs, the proxy gateway 180 regenerates the IP packets by de-encapsulating the PDUs. For an embodiment, de-encapsulation generates IP packets consistent with a format of the IP packets generated by the application 110. As previously described, encapsulating includes reformatting the IP packets in conformance with the specified PDU format of the proxy gateway 180. De-encapsulation includes reformatting the PDUs to back to an IP format according to the application 110.

For at least some embodiments, the proxy gateway 180 then communicates the de-encapsulated PDUs (regenerated IP packets) to destinations as specified by the IP packets. For an embodiment, the proxy gateway 180 then operates to receive response IP packets from the destinations. For an embodiment, the proxy gateway 180 then operates to encapsulate the response IP packets as response PDUs, and communicate the response IP packets to the base station 160. For an embodiment, the base station 160 then communicates the response IP packets back to the computing device 100 through the PDUs.

Data Received by the Computing Device

At least some embodiments further include receiving, by the computing device 100, frames of data transmitted from the base station 160 through the wireless link 150 over a full-time duration of unused control information slots of the frames. Further, the computing device 100 operates to extract PDUs from unused control information slots. Further, the proxy interface 120 of the computing device 100 operates to de-encapsulate IP packets from extracted PDUs, and provide the de-encapsulated IP packets to an application (such as, application 110) operating on the computing device 100.

For at least some embodiments, receiving, by the computing device 100, frames of data transmitted from the base station 160 through the wireless link 150 over a full-time duration of unused control information slots includes receiving by the computing device 100 indication from the base station 160 that the base station 160 has PDUs to send to the computing device 100 and receiving, by the computing device 100, the frames of data that include the extracted PDUs. For example, the base station may send a specifically structured PDU announcing the availability of data to send, and, while sending data as PDUs, may set a flag on these PDUs indicating the base station has "more to send." Once that flag is not set, the computing device may conclude that it has finished receiving all the PDUs the base station has available to send. At least some embodiments include a PDU structure announcing availability of data to send, more to send, or other functionalities (including service designators and service requests, as detailed below) and could be further specified as needed.

Service Designators

For at least some embodiments, the proxy interface 120 further operates to request a set of service designators from the proxy gateway 180. For an embodiment, the set of service designators supports one or more specific service requests. For at least some embodiments, the set of service designators defines a format the proxy gateway 180 expects the PDUs to arrive in. For an embodiment, when the proxy interface 120 receives the PDUs, the proxy interface 120 can then extract data from the application 110 on the computing device 100 and restructure the data (encapsulate the IP packets of data) as a PDU conformant with the service designator's required format. Examples of specific service requests that might be supported are phone-to-fax, stock market quotes, sporting scores, or other value-added services a telecommunication provider or internet service would like to provide.

As previously described, for an embodiment, the proxy interface 120 receives an IP packet from the application 110. The proxy interface extracts a data payload of the IP packet. For an embodiment, the proxy interface 120 restructures the data payload to comply with specification set forth in the service designator provided by the proxy gateway 180. Further, for at least some embodiments, the restructuring is further based on a local port designated by the application (for example, application 110) that corresponds to a specific service request associated with a given service designator. The proxy interface 120 then encapsulates the restructured data payload as a PDU. Generally, this includes encapsulating the restructured data payload into multiple PDUs. For an embodiment, the proxy interface 120 then orders the multiple PDUs according to the previously described ordering. The computing device 100 then transmits the PDUs within a frame of data according to the ordering. The frames of data are transmitted by the radio 140 of the computing device through the wireless link 150 to the base station 160.

As previously stated, for an embodiment, the set of service designators supports one or more specific service requests. For an embodiment, the one or more specific service requests are associated with a service designator on the proxy gateway that provides a response to the specific service request upon receiving a single bit from the computing device. Providing the response using a single bit provides very efficient use of low-bandwidth connections.

For an embodiment, the service designator allows for custom rich service delivery. This can be applicable, for example, to an application developer focusing on low-connectivity populations. The application developer may want to expose a service on a telecommunication provider's proxy gateway that provides, for example, cricket scores. The application developer may want the telecommunication service provider to host a specific service designator on their proxy gateway that simply listens for an incoming bit from a computing device. For this example, when proxy gateway receives the single incoming bit, the proxy gateway transmits back the latest cricket scores. This way the requesting computing device only has to send a single bit which is efficient for low bandwidth connections.

For at least some embodiments, at least one of the set of service designators includes controlling an application operating on the computing device based on PDU structure and content. For an embodiment, the proxy gateway 180 structures a PDU to comply with specification set forth in one or more of the service designators. Further, for an embodiment, the proxy gateway transmits the structured PDU to the proxy interface on the computing device. Further, for an embodiment, the proxy interface provides the structured PDU to an application operating on the computing device. Further, for an embodiment, the application executes logic on the basis of the PDU structure and content.

An embodiment of the use of the structured PDU includes a customer service chat experience hosted by a telecommunication company. For example, for an embodiment, based on responses from a customer service agent, specifically structured PDUs enable the application on the customer's phone (computing device) to go to a specific menu screen, to load a local asset like a help video or audio explanation, or to display other rich data without requiring transport (e.g. a text code corresponding to an image of instructions on how to setup call forwarding or whatever the customer is asking about). Another embodiment of the use of the structured PDU includes deep linking. For an embodiment, this includes a user of a computing device opening a specific page of an application instead of opening the application. Another embodiment of the use of the structured PDU includes a messaging application that enables a custom code corresponding to a given sticker to be transmitted, resulting in the rendering of a sticker graphic on the receiving computing device without needing to transmit the graphic remotely (assuming the sticker graphic is available already within the receiving application).

Figure 4:
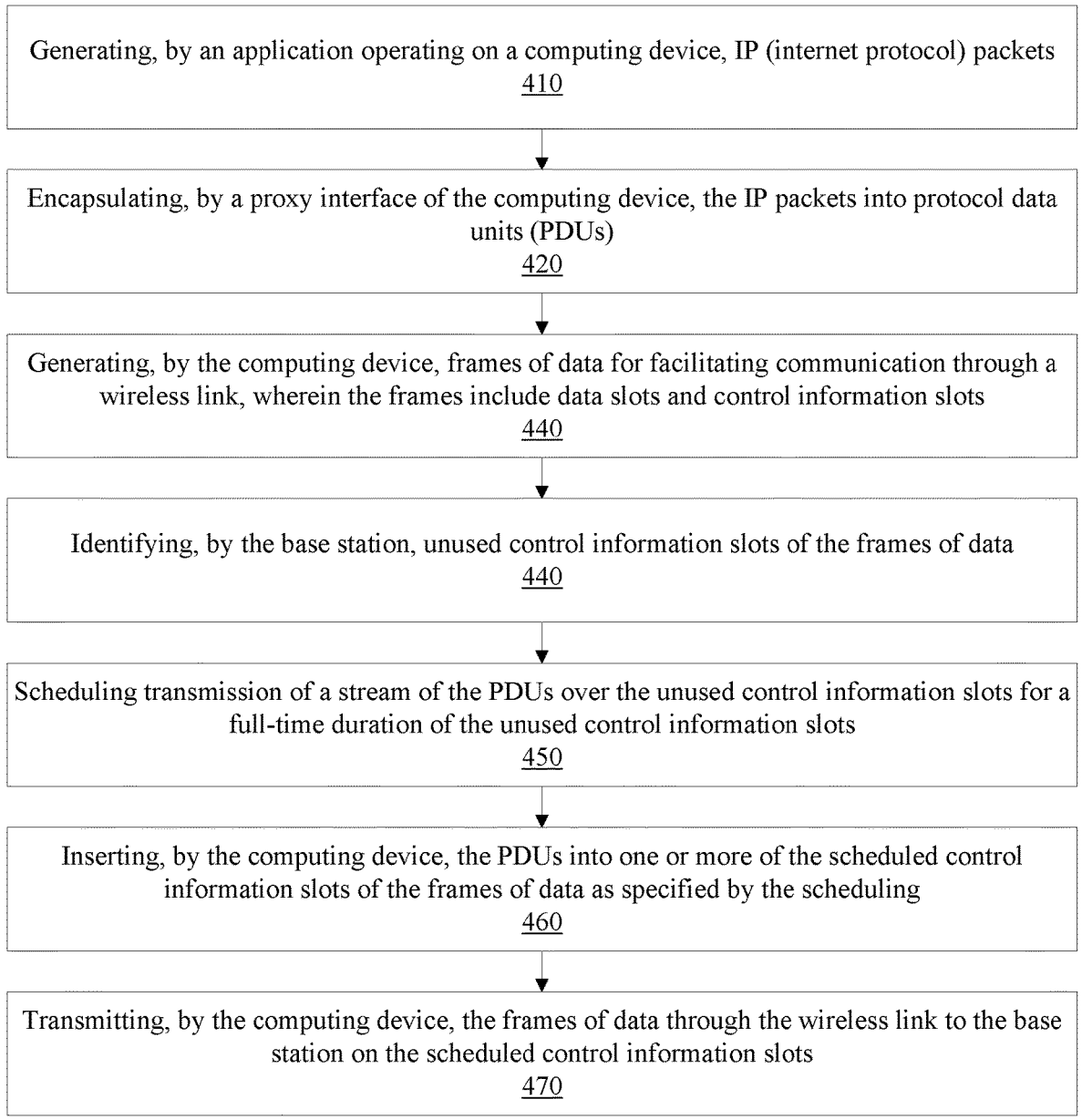
FIG. 4 is a flow chart that includes steps of a method of a computing device communicating information to a proxy gateway through a wireless link, according to an embodiment.

FIG. 4 is a flow chart that includes steps of a method of a computing device communicating information to a proxy gateway through a wireless link, according to an embodiment. A first step 410 includes generating, by an application operating on a computing device, IP (internet protocol) packets. A second step 420 includes encapsulating, by a proxy interface of the computing device, the IP packets into protocol data units (PDUs). A third step 430 includes generating, by the computing device, frames of data for facilitating communication through a wireless link, wherein the frames include data slots and control information slots. A fourth step 440 includes identifying, by the base station, unused control information slots of the frames of data. A fifth step 450 includes scheduling transmission of a stream of the PDUs over the unused control information slots for a full-time duration of the unused control information slots. A sixth step 460 includes inserting, by the computing device, the PDUs into one or more of the scheduled control information slots of the frames of data as specified by the scheduling. A seventh step 470 includes transmitting, by the computing device, the frames of data through the wireless link to the base station on the scheduled control information slots.

As previously described, for an embodiment, encapsulating includes the proxy interface determining an appropriate USSD (Unstructured Supplementary Service Data) format for PDUs as specified by a proxy gateway and reformatting the IP packets in conformance with the specified PDU format (for example charset, encoding, and any required fields such as payload or more-to-send) of the proxy gateway. As described, at least some embodiments further include scheduling transmission of a stream of the PDUs over unused control information slots for a full-time duration of the unused control information slots.

As previously described, at least some embodiments further include opening, by the computing device, a USSD (Unstructured Supplementary Service Data) connection, and ordering, by the computing device, the PDUs according to the application operating on the computing device. For an embodiment, timing of transmission of the stream of the PDUs over the unused control information slots is further based on the ordering. Further, the computing device transmits the frames of data which include the ordered PDUs. As previously described, opening the connection includes transmission by the computing device of a specified "shortcode" to the proxy gateway, whereupon the proxy gateway establishes, via the network and the base station, a USSD connection with the computing device.

As previously described, at least some embodiments further include load balancing of the IP packets transmitted by the computing device. For an embodiment, this includes selecting, by the computing device, a local port according to application logic for a destination of the IP packets as specified by the application operating on the computing device for the proxy interface, and ordering, by the proxy interface of the computing device, the PDUs further based on priorities designated by the selected local port. For an embodiment, a local port is a port on the computing device.

At least some embodiments include load balancing across computing devices. For an embodiment, a user of a computing device or the developer of an application may pay more for a higher quality of service (QoS) than other computing devices or applications. For an embodiment, the load balancing prioritizes the computing devices or applications of users or developers that pay a premium for the higher QoS. The higher QoS is associated with a privileged IP:Port pair designating an alternate proxy gateway. For an embodiment, an alternate proxy gateway may be (but is not required to be) a virtual proxy gateway. For an embodiment, a network operator of the base station and the computing device can drive load balancing across different virtual proxy gateways. For example, if the network is congested, then the operator of the network can drive load balancing of the data traffic of the different computing devices by directing them to different virtual proxy gateways.

As previously described, at least some embodiments further include receiving, by a proxy gateway, the PDUs from the base station through a network, regenerating the IP packets by de-encapsulating the PDUs, communicating the de-encapsulated PDUs to destinations, and receiving, by the proxy gateway, response IP packets from the destinations, encapsulating, by the proxy gateway, the response IP packets as response PDUs, and communicating, by the proxy gateway, the response IP packets to the base station.

As previously described, at least some embodiments further include receiving, by the computing device, frames of data transmitted from the base station through the wireless link over a full-time duration of unused control information slots of the frames, extracting, by the computing device, PDUs from unused control information slots, de-encapsulating, by the proxy interface of the computing device, IP packets from extracted PDUs, and providing, to an application operating on the computing device, the de-encapsulated IP packets.

For at least some embodiment, receiving, by the computing device, frames of information transmitted from the base station through the wireless link over a full-time duration of unused control information slots includes receiving by the computing device indication from the base station that the base station has PDUs to send to the computing device, and receiving, by the computing device, the frames of data that include the PDUs.

As previously described at least some embodiments further include requesting, by the proxy interface, a set of service designators from the proxy gateway. For at least some embodiments, the set of service designators supports one or more specific service requests. For at least some embodiments, at least one of the set of service designators includes controlling one or more applications operating on the computing device based on PDU structure and content.

For an embodiment, the one or more specific service requests are associated with a service designator on the proxy gateway that provides a response to the specific service request upon receiving a single bit from the computing device. While described as receiving a single bit, it is to be understood that other implementations may use some select number of bits, thereby permitting more custom responses to the computing device.

For an alternate embodiment, the specific server request may be implemented based on a shortcode the proxy interface chooses to establish the USSD connection. For example, a request sent to a specified shortcode may follow a specified PDU structure and content enabling a specific function, such as returning a horoscope for a given astrological sign, a weather report for a location, or a sports score for a sports game.

Compression

For an embodiment, the one or more specific service requests includes a specific compression, wherein the specific compression is performed through the use of a pre-shared dictionary, and wherein the proxy gateway performs decompression after de-encapsulating IP packets from the PDUs. At least some embodiments further includes transmitting, by the proxy gateway, a resulting payload to a web service provider, receiving and authenticating, by the proxy interface, with the proxy gateway, a current accepted list of dictionaries, retrieving, by the proxy interface, up-to-date dictionaries for compression, and exposing, by the proxy interface, dictionary-based compression to an application operating on the computing device for preparation of an IP payload.

Security

For at least some embodiments, at least one of the service requests lists one or more security protocols for transmission of the stream of PDUs over the unused control information slots of the frames. At least some embodiments further include selecting, by the proxy interface, a security protocol from the list, communicating, by the proxy interface, the selected security protocol to the proxy gateway, implementing, by the proxy interface, the selected security protocol, and exposing, by the proxy interface, the selected security protocol to the application operating on the computing device for preparation of an IP payload. For an embodiment, the proxy gateway supports transport security of some type over the USSD channel.

At least some embodiments further include notifying, by the proxy gateway, the proxy interface of availability of security updates for the computing device, communicating, by the proxy gateway, to the proxy interface, the security updates as PDUs over the unused control information slots, buffering, by the proxy interface, the received PDUs comprising the security update, and providing, by the proxy interface, to an operating system of the computing device, the security update once the security update is fully received.

For an embodiment, the proxy interface may be notified by the phone (computing device) manufacturer or the computing device's operating system manufacturer, via the proxy gateway, when the computing device's operating system is out of date and needs a critical security patch. For an embodiment, the proxy interface is also notified by the proxy gateway via service designators and specific service requests that a security update is available. For an embodiment, this notification may take place as a weekly or other periodic request by the proxy interface to the proxy gateway for service designators and specific service requests confirming the availability of a security update. For an embodiment, the security update is then to be transmitted in pieces to the computing devices when unused control information slots are available, such that the whole file does not need to be transmitted at once. Once the entire file is received, then the proxy interface passes the completed file to the computing device's operating system to apply the security patch. This allows the updating of computing devices that are not connected to the internet with critical security patches.

Figure 5:
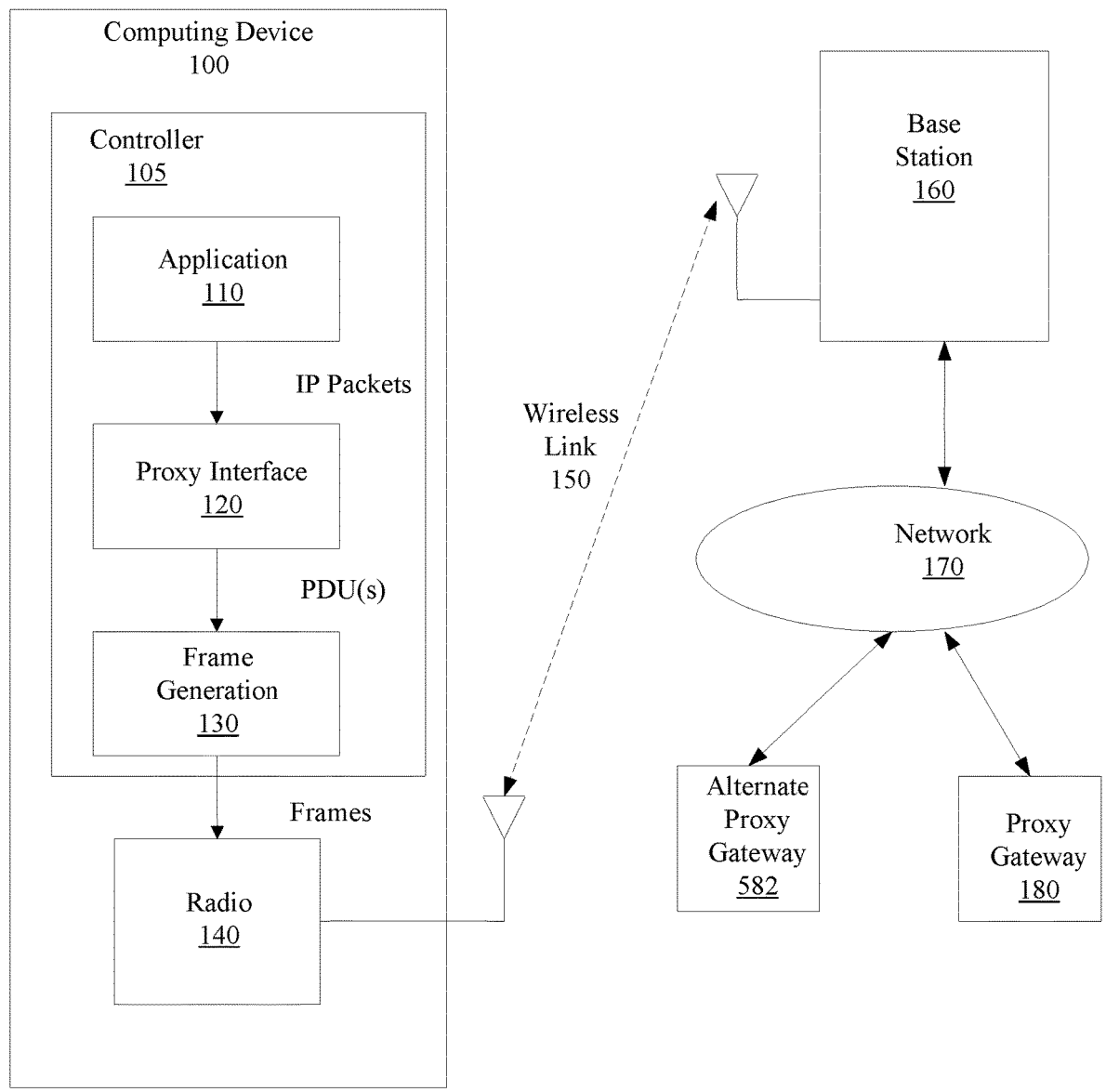
FIG. 5 shows a computing device that communicates information with a proxy gateway and an alternate proxy gateway through a wireless link, according to an embodiment.

FIG. 5 shows a computing device 100 that communicates information with a proxy gateway 180 and an alternate proxy gateway 582 through a wireless link 150, according to an embodiment. For at least some embodiments, one or more of the specific service requests directs selection of the alternate proxy gateway 582 to the computing device. While only a single alternate proxy gateway 582 is shown in FIG. 5, at least some embodiments include any number of alternate proxy gateways.

For an embodiment the alternate proxy gateway provides delivery guarantees for IP packets from the proxy interface of the computing device to the IP packet destinations. For at least some embodiments this is accomplished by the alternate proxy gateway monitoring IP packet delivery to the IP packet destinations for successful receipt acknowledgement, and re-transmitting IP packets that do not receive successful receipt acknowledgements. For an embodiment the alternate proxy gateway provides acknowledgment of successful receiving of PDUs from the proxy interface to the proxy interface. For an embodiment the alternate proxy gateway provides delivery guarantees for PDUs destined for the proxy interface of the computing device.

For an embodiment, alternate proxy gateways offer different qualities of service. For example, telecommunication companies could charge for higher quality service, or offer better service for critical applications like government or public safety applications.

Figure 6:
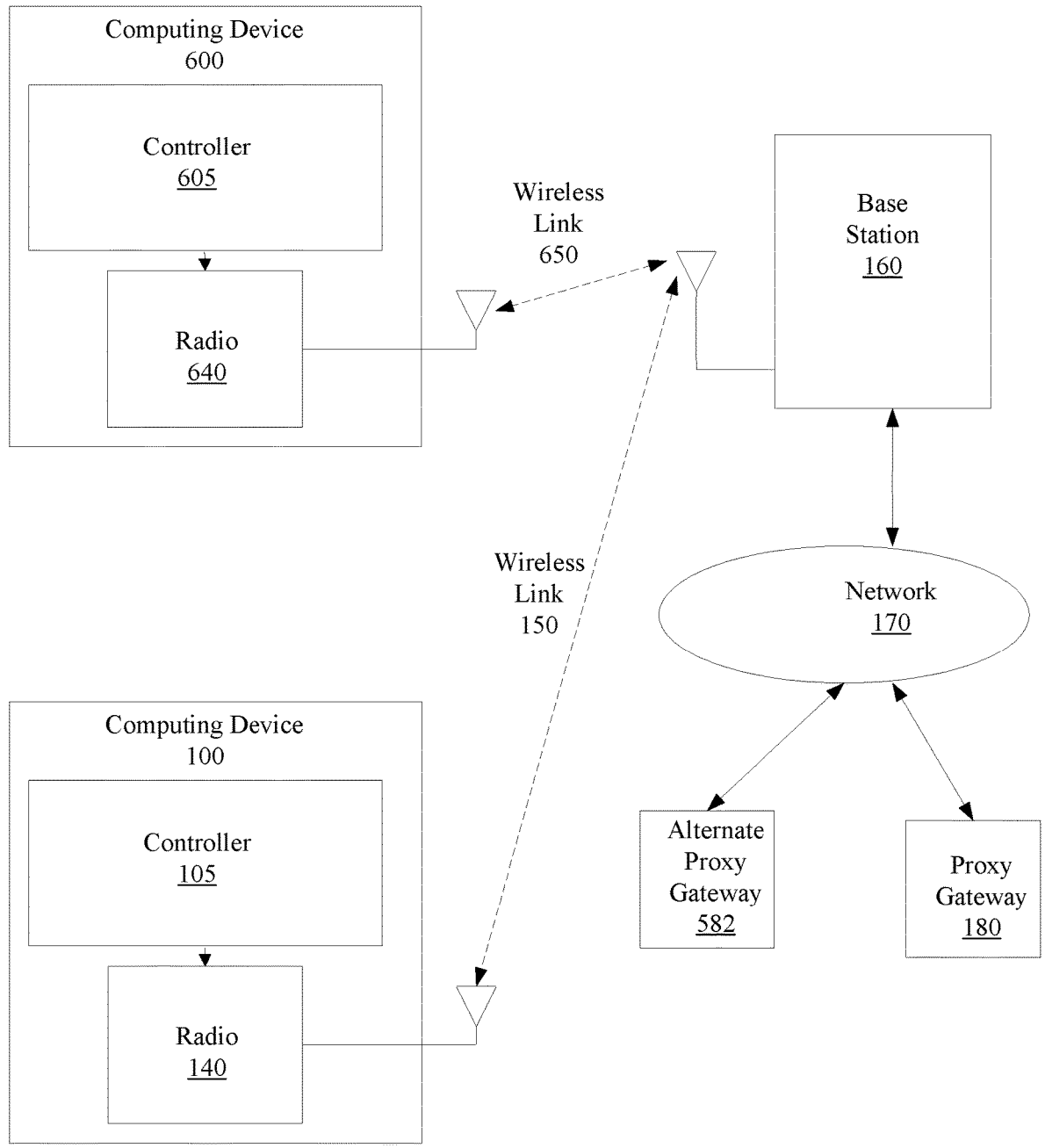
FIG. 6 shows a plurality of computing devices that communicates information with a proxy gateway and an alternate proxy gateway through wireless links, according to an embodiment.

FIG. 6 shows a plurality of computing devices 100, 600 that communicate information with a proxy gateway 180 and an alternate proxy gateway 582 through wireless links 150, 650, according to an embodiment. While two computing devices 100, 160 are shown in FIG. 6, it is to be understood that at least some embodiments include more than two computing devices. At least some embodiments further include providing, by the proxy gateway 180, availability of the computing device 100 or other computing devices (such as, computing device 600), to one or more external devices, receiving, by the proxy gateway, IP packets with identifiers of the computing device or other computing devices, from the one or more external devices, encapsulating, by the proxy gateway, the IP packets as PDUs for the corresponding computing devices associated with the identifiers, and communicating, by the proxy gateway, the PDUs to the corresponding computing devices.

For an embodiment, the proxy gateway 180 makes available the set of computing devices 150, 650. For an embodiment, the network operator makes the computing devices 150, 650 available as routable endpoints to the rest of the internet (for example, to a business partner who wants to communicate with them). A device connected to the internet provides an IP packet with some special payload (for example, a designator, such as, a phone number for the computing device the device is attempting to reach) to the proxy gateway. The proxy gateway then does a lookup to see if that designator matches a customer that is signed up for this service and, if yes, then sends the IP packet as a PDU to the computing device over an unused control information slot.

IoT (Internet of Things)

For an embodiment, computing devices (such as, computing device 100) having proxy interfaces (such as, proxy interface 120) connected to proxy gateways (such as, proxy gateway 180) can be utilized to provide a data transport service for very large sensor networks with relaxed latency requirement. The sensed data can be transported by the computing devices from a field of sensors through the unused control information slots when available. This IoT solution provides a less expensive option than existing solutions that use data slots. For some embodiments, some data loss of the sensed data is acceptable. Accordingly, for an embodiment, the computing devices operate to buffer the sensor data until the buffers of the computing devices are full, and then open a USSD stream to flush the sensor data of the buffers back to the network via the proxy gateway. This embodiment may be acceptable to a user if the savings in data cost is worth some marginal loss in the sensor data.

Although specific embodiments have been described and illustrated, the embodiments are not to be limited to the specific forms or arrangements of parts so described and illustrated. The described embodiments are to only be limited by the claims.

What is claimed:

1. A method comprising:
    generating, by an application operating on a computing device, IP (internet protocol) packets;
    encapsulating, by a proxy interface of the computing device, the IP packets into protocol data units (PDUs);
    generating, by the computing device, frames of data for facilitating communication through a wireless link, wherein the frames of data include data slots and control information slots;
    identifying, by a base station, unused control information slots of the frames of data;
    scheduling transmission of a stream of the PDUs over the unused control information slots;
    inserting, by the computing device, the PDUs into one or more of the scheduled unused control information slots of the frames of data as specified by the scheduling;
    transmitting, by the computing device, the frames of data through the wireless link to the base station on the scheduled unused control information slots;
    receiving, by a proxy gateway, the PDUs from the base station through a network;
    regenerating the IP packets by de-encapsulating the PDUs;
    communicating the de-encapsulated PDUs to destinations;
    receiving, by the proxy gateway, response IP packets from the destinations;
    encapsulating, by the proxy gateway, the response IP packets as response PDUs; and
    communicating, by the proxy gateway, the response IP packets to the base station.

2. The method of claim 1, further comprising:
    opening, by the computing device, a USSD (Unstructured Supplementary Service Data) connection;
    ordering, by the computing device, the PDUs according to the application operating on the computing device;
    wherein timing of transmission of the stream of the PDUs over the unused control information slots is further based on the ordering; and
    wherein transmitting, by the computing device, the frames of data further include the ordered PDUs.

3. The method of claim 2, further comprising load balancing of the IP packets transmitted by the computing device, comprising:
    selecting, by the computing device, a local port according to application logic for a destination of the IP packets as specified by the application operating on the computing device for the proxy interface; and
    ordering, by the proxy interface of the computing device, the PDUs further based on priorities designated by the selected local port.

4. The method of claim 1, further comprising:
    receiving, by the computing device, frames of data transmitted from the base station through the wireless link;
    extracting, by the computing device, PDUs from unused control information slots;
    de-encapsulating, by the proxy interface of the computing device, IP packets from extracted PDUs; and
    providing, to an application operating on the computing device, the de-encapsulated IP packets.

5. The method of claim 4, wherein receiving, by the computing device, frames of information transmitted from the base station through the wireless link over a full-time duration of unused control information slots comprises:
    receiving, by the computing device, indication from the base station that the base station has PDUs to send to the computing device; and
    receiving, by the computing device, the frames of data that include the PDUs.

6. The method of claim 1, further comprising:
    requesting, by the proxy interface, a set of service designators from the proxy gateway.

7. The method of claim 6, wherein the set of service designators supports one or more specific service requests.

8. The method of claim 7, wherein the one or more specific service requests are associated with a service designator on the proxy gateway that provides a response to the specific service request upon receiving a single bit from the computing device.

9. The method of claim 7, wherein the one or more specific service requests directs selection of an alternate proxy gateway to the computing device.

10. The method of claim 9, further comprising one or more of the following:
    providing, by the alternate proxy gateway, delivery guarantees for IP packets from the proxy interface of the computing device to the IP packet destinations;
    providing, by the alternate proxy gateway, acknowledgment of successful receiving of PDUs from the proxy interface; or
    providing, by the alternate proxy gateway, delivery guarantees for PDUs destined for the proxy interface of the computing device.

11. The method of claim 7, wherein the one or more specific service requests includes a specific compression, wherein the specific compression is performed through the use of a pre-shared dictionary, and wherein the proxy gateway performs decompression after de-encapsulating IP packets from the PDUs, and further comprising:
- transmitting, by the proxy gateway, a resulting payload to a web service provider;
- receiving and authenticating, by the proxy interface, with the proxy gateway, a current accepted list of dictionaries;
- retrieving, by the proxy interface, up-to-date dictionaries for compression; and
- exposing, by the proxy interface, dictionary-based compression to the application operating on the computing device for preparation of an IP payload.

12. The method of claim 7, wherein at least one of the service requests includes a list of one or more security protocols for transmission of the stream of PDUs over the unused control information slots of the frames of data, and further comprising:
- selecting, by the proxy interface, a security protocol from the list;
- communicating, by the proxy interface, the selected security protocol to the proxy gateway; and
- implementing, by the proxy interface, the selected security protocol, or
- exposing, by the proxy interface, the selected security protocol to the application operating on the computing device for preparation of an IP payload.

13. The method of claim 6, wherein at least one of the set of service designators includes controlling one or more applications operating on the computing device based on PDU structure and content.

14. The method of claim 1, further comprising:
- providing, by the proxy gateway, availability of the computing device or other computing devices, to one or more external devices;
- receiving, by the proxy gateway, IP packets with identifiers of the computing device or other computing devices, from the one or more external devices;
- encapsulating, by the proxy gateway, the IP packets as PDUs for the corresponding computing devices associated with the identifiers; and
- communicating, by the proxy gateway, the PDUs to the corresponding computing devices.

15. The method of claim 1, further comprising:
- notifying, by the proxy gateway, the proxy interface of availability of security updates for the computing device;
- communicating, by the proxy gateway, to the proxy interface, the security updates as PDUs over the unused control information slots;
- buffering, by the proxy interface, the received PDUs comprising the security update; and
- providing, by the proxy interface, to an operating system of the computing device, the security update once the security update is fully received.

16. A system comprising:
- a base station;
- a computing device;
- a proxy gateway;
- wherein an application operating on the computing device operates to generate IP (internet protocol) packets;
- wherein a proxy interface operating on the computing device operates to encapsulate the IP packets into protocol data units (PDUs);
- the computing device operating to generate frames of data for facilitating communication through a wireless link between the computing device and the base station, wherein the frames of data include data slots and control information slots;
- the base station operating to:
  - identify unused control information slots of the frames of data;
  - schedule transmission of a stream of the PDUs over the unused control information slots;
- the computing device operating to:
  - insert the PDUs into one or more of the scheduled control information slots of the frames of data as specified by the schedule; and
  - transmit the frames of data through the wireless link to the base station on the scheduled control information slots;
- the proxy gateway operating to:
  - receive the PDUs from the base station through a network;
  - regenerate the IP packets by de-encapsulating the PDUs;
  - communicate the de-encapsulated PDUs to destinations;
  - receive response IP packets from the destinations;
  - encapsulate the response IP packets as response PDUs; and
- communicating, by the proxy gateway, the response IP packets to the base station.

17. The system of claim 16, wherein
- opening, by the computing device, a USSD (Unstructured Supplementary Service Data) connection;
- ordering, by the computing device, the PDUs according to the application operating on the computing device;
- wherein timing of transmission of the stream of the PDUs over the unused control information slots is further based on the ordering; and
- wherein transmitting, by the computing device, the frames of data further include the ordered PDUs.

18. The system of claim 17, wherein the computing device further operates to load balance IP packets transmitted by the computing device comprising the computing device operating to:
- select a local port according to application logic for a destination of the IP packets as specified by the application operating on the computing device for the proxy interface; and
- order, by the proxy interface of the computing device, the PDUs further based on priorities designated by the selected local port.

19. The system of claim 16, wherein
- the proxy interface operates to request a set of service designators from the proxy gateway, wherein the set of service designators supports one or more specific service requests, wherein at least one of the set of service designators includes controlling one or more applications operating on the computing device based on PDU structure and content, wherein the one or more specific service requests directs selection of an alternate proxy gateway to the computing device;
- wherein the alternate proxy gateway operates to provide at least one of:
  - delivery guarantees for IP packets from the proxy interface of the computing device to the IP packet destinations;
  - acknowledgment of successful receiving of PDUs from the proxy interfaces;

delivery guarantees for PDUs destined for the proxy interface of the computing device.

* * * * *